United States Patent
Viljoen et al.

(10) Patent No.: US 8,234,709 B2
(45) Date of Patent: Jul. 31, 2012

(54) STREAMING MALWARE DEFINITION UPDATES

(75) Inventors: Petrus Johannes Viljoen, Redondo Beach, CA (US); Jens Meggers, Redondo Beach, CA (US)

(73) Assignee: Symantec Operating Corporation, Mountain View, CA (US)

( * ) Notice: Subject to any disclaimer, the term of this patent is extended or adjusted under 35 U.S.C. 154(b) by 893 days.

(21) Appl. No.: 12/142,905

(22) Filed: Jun. 20, 2008

(65) Prior Publication Data

US 2009/0320133 A1 Dec. 24, 2009

(51) Int. Cl.
H04L 29/06 (2006.01)
(52) U.S. Cl. .................................. 726/24; 717/170
(58) Field of Classification Search ............. 726/24; 717/168–173
See application file for complete search history.

(56) References Cited

U.S. PATENT DOCUMENTS

| 5,948,104 A * | 9/1999 | Gluck et al. ............... 726/24 |
| 7,665,081 B1 * | 2/2010 | Pavlyushchik ............. 717/168 |
| 2005/0257205 A1 * | 11/2005 | Costea et al. ............. 717/168 |

FOREIGN PATENT DOCUMENTS

| WO | WO 02/19067 A2 | 3/2002 |
| WO | WO 03/085884 A1 | 10/2003 |

* cited by examiner

Primary Examiner — Edward Zee
(74) Attorney, Agent, or Firm — Campbell Stephenson LLP

(57) ABSTRACT

A method, system and apparatus for assembling and publishing frequent malware signature definition updates through the use of additive or "streaming" definition packages is provided. Embodiments of the present invention provide such functionality by publishing not only full malware signature definition updates on a long periodicity but also streaming malware signature definition updates containing newly certified signature definitions on a short periodicity. As newly-certified malware signature definitions are received, those newly-certified signature definitions are incorporated not only in the full signature definition file but also in a streaming signature definition update that contains only newly-certified signature definitions received during a streaming update period. At the end of the streaming update period, a streaming signature definition file is made available by publication to anti-malware clients. A streaming signature definition file only contains those signature definitions received during the assembly period for that streaming definition file. Embodiments of the present invention replace a previous streaming signature definition file with a new streaming signature definition file at the time of publication of the new streaming signature definition file.

22 Claims, 7 Drawing Sheets

STREAMING MALWARE DEFINITION UPDATES

FIELD OF THE INVENTION

The present invention relates to the field of computer security, and particularly to providing streaming malware signature definition updates to anti-malware client software.

BACKGROUND OF THE INVENTION

Wide area networks, such as the Internet, provide an ever-increasing community of users with a similarly increasing number of accessible network sites from which those users can gather information, applications, and entertainment. Such an open community also provides opportunity for malicious users and sites to spread malicious software (malware) such as viruses, Trojan horses, worms, and the like. In order to protect users from such malicious activity, anti-malware protection schemes have been devised to alert users to the presence of malware on their computers and to cleanse affected computers from malware.

Typical computer protection schemes react to the presence of malware on an affected computer. A common method of detecting malware relies on signatures extracted from the malware body. Different types of data extracted from a malware body can be used to generate signatures. Such data include, for example, strings (i.e., patterns with or without wild cards), checksums (e.g., CRC, MD5 and SHA1), behavior patterns, file geometry, execution flow geometry, and statistic distribution of code instructions. Any combination of the above list can be used to generate a malware signature, and the list is not exhaustive. More sophisticated polymorphic malware (e.g., malware that incorporates changing encryption algorithms and keys so that replications of the malware are not identical) require more sophisticated signature generation techniques, including cryptanalysis, dedicated decryption routines, emulation, and the like.

In order for security software executing on a computer to be able to detect a newly discovered instance of malware, the computer must be provided with a copy of the signature that has been established to identify the new instance of malware. As many as 7,000 to 10,000 new instances of malware are typically discovered on a daily basis. As an instance of malware propagates through a wide area network, a delay in providing a signature associated with that malware to computers on the wide area network will leave those computers open to attack. Therefore, it is desirable to rapidly distribute newly generated and certified signatures to a community of computers.

Typical anti-malware software downloads new signature definitions at periods of 1 to 8 hours from an update server. Full signature definition files that are retrieved by a typical system contain signature definitions for all currently found signatures or a differential between a currently installed full signature definition file on a client computer and a currently published full signature definition file on a server associated with the anti-malware software. The act of downloading these full definition files by a large number of client computers from one or more associated distribution servers can consume significant network bandwidth resources. Increasing a publication rate of full definition files, in order to improve anti-malware coverage, would lead to a potentially dramatic increase in network bandwidth consumption. It is therefore desirable to implement a system that not only provides updates to signature definitions at a rate on the order of minutes, rather than hours, but also is conservative of network bandwidth resources.

SUMMARY OF THE INVENTION

Embodiments of the present invention provide a mechanism for providing updates to malware signature definitions on the order of minutes, as well as providing full updates during longer time periods, and providing such updates in a manner conservative of network resources. Embodiments of the present invention provide a method, apparatus and system configured to assemble and publish a full signature definition file comprising a malware signature and to assemble and publish a streaming definition file comprising the malware signature. The full signature definition file includes both the malware signature and a first plurality of malware signatures received up to a specified time, and publication of the full signature definition file occurs after the specified time. The streaming signature definition file includes both the malware signature and a second plurality of malware signatures received over a first time period that begins and ends prior to the specified time, and publication of the streaming signature definition file occurs upon completion of the first time period.

Aspects of the above embodiment of the present invention provide for publishing the streaming signature definition file to include transmitting the streaming signature definition file in response to a request from a first node, when the request is received after the first end time. Another aspect of the above embodiment of the present invention provides for assembling and publishing a second streaming signature definition file comprising a third plurality of malware signatures, wherein the assembling of the second streaming signature definition file occurs over a second time period that is after the end of the first time period and prior to the specified time. A further aspect of the above embodiment provides for replacing the first streaming signature definition file with the second streaming signature definition file upon completion of the second time period. Another aspect of the above embodiment of the present invention provides for assembling the streaming signature definition file by appending the malware signature to a list including one or more malware signatures of the second plurality of malware signatures. An additional aspect of the present invention provides for assembling the streaming signature definition file by appending a pointer to a location of the malware signature to a list including one or more pointers to corresponding malware signatures of the second plurality of malware signatures.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention provides a mechanism for providing frequent signature definition updates through the use of additive or "streaming" definition packages. Embodiments of the present invention provide such functionality by publishing not only full signature definition updates on a long periodicity (e.g., on the order of hours) but also streaming definition updates containing newly certified signature definitions on a short periodicity (e.g., on the order of minutes). As signature update servers incorporating embodiments of the present invention receive newly-certified malware signature definitions, those newly-certified signature definitions are incorporated not only in the full signature definition file but also in a streaming signature definition update that contains only newly-certified signature definitions received during a streaming update period. At the end of the streaming update period, the signature update server makes a streaming signature definition file available by publication to anti-malware clients. A streaming signature definition file only contains those signature definitions received during the assembly period for that streaming definition file. Embodiments of the present invention replace a previous streaming signature definition file with a new streaming signature definition file at the time of publication of the new streaming signature definition file.

Anti-malware clients using embodiments of the present invention incorporate the signature definitions received in the streaming signature definition file in an additive fashion to previously received streaming signature definitions and those received in the most immediate previous full definition file. Upon receipt of a newly published full signature definition file that incorporates signatures previously received within streaming signature definition files, anti-malware clients using embodiments of the present invention cease to use the previously-received streaming definitions of those signatures and only use those found within the full signature definition file.

In this manner, anti-malware clients incorporating embodiments of the present invention can receive signature definition updates in a manner of minutes after certification of new malware signatures. In addition, because streaming signature definition files only contain those signatures received during the streaming definition assembly period, embodiments of the present invention are conservative of network bandwidth resources.

Figure 1:
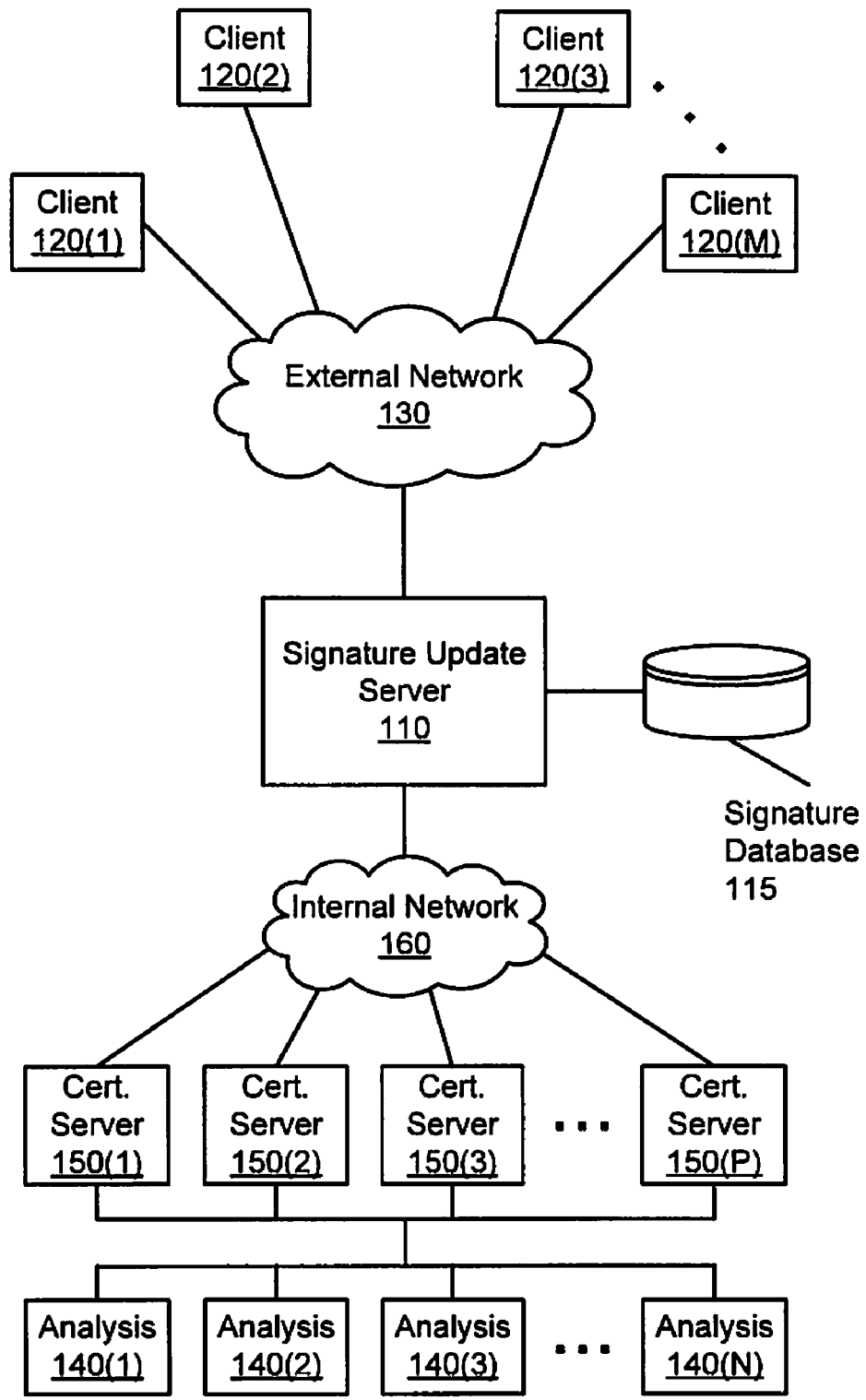
FIG. 1 is a simplified block diagram illustrating a network configuration for distribution of anti-malware signatures to anti-malware clients.

FIG. 1 is a simplified block diagram illustrating a network configuration for distribution of anti-malware signatures to anti-malware clients. A signature update server 110 is maintained by an anti-malware software provider. Signature update server 110 is associated with a signature database 115 that stores malware signatures that have been certified for publication to clients of the anti-malware software provider. The signature update server is coupled to client computers 120(1)-(M) via an external network 130 (e.g., a wide-area network such as the Internet). Through this network connection, signature update server 110 can provide signature definition file updates to client computers 120(1)-(M), using a variety of data transmission protocols. Alternatively, signature update server 110 can be coupled to one or more signature distribution servers (not illustrated) that are in turn responsible for distributing signature update files that have been published by signature update server 110 to the community of client computers. In this manner, distribution responsibilities can be distributed geographically via each of the distribution servers.

The malware signatures distributed by signature update server 110 can be generated by one or more analysis engines 140(1)-(N) executing on one or more processing nodes. As new instances of malware are discovered by the anti-malware software provider, these instances of malware are provided to analysis engines 140(1)-(N) in order to determine an appropriate signature for identifying the instance of malware. Such analysis can result in signatures being based upon data extracted from the malware body, including, for example, string patterns, checksums, behavior patterns, file geometry, execution flow geometry, and statistical distribution of code instructions, or a combination thereof. For more sophisticated malware (e.g., polymorphic or metamorphic malware), more processing-intensive signature generation may be used, such as emulation techniques in which the potential malware is executed in a controlled, simulated environment in order to determine behavior of the malware.

Once analysis engines 140(1)-(N) have determined an appropriate signature corresponding to the malware instance, certification servers 150(1)-(P) can determine whether use of the generated signature would generate a false positive result. For example, a certification server can maintain a clean file collection of well-known files that may be found on a typical client's computer (e.g., operating systems files, typical applications, and the like). In the case of a signature generated by a hash or checksum (e.g., CRC), the malware checksum signature can be checked against similarly generated checksums for each file in the clean file collection. A database can contain meta information about each file in the clean file collection (e.g., a collection of one or more of the variously generated hashes or checksums) and a lookup can be performed against this database. If the proposed malware signature matches a signature generated for a file in the clean file collection, then that malware signature is discarded in favor of a hash-based signature generated by an alternate analysis engine or a hash or checksum generated from a larger sampling of the malware file. Once a signature passes the certification phase, then the signature is made available to signature update server 110 via an internal network 160.

Different types of malware analysis can take differing amounts of time to perform. For example, generation and false positive testing of a hash or checksum takes significantly less time than behavioral emulation of an instance of polymorphic malware, since the emulation signature has to be tested against an emulation of each file in the clean file collection. Further, signatures generated by differing types of analysis can be of differing lengths and will be used in different ways by the client software. Embodiments of the present invention are not limited to specific methods of analysis of malware or certification thereof.

Figure 2:
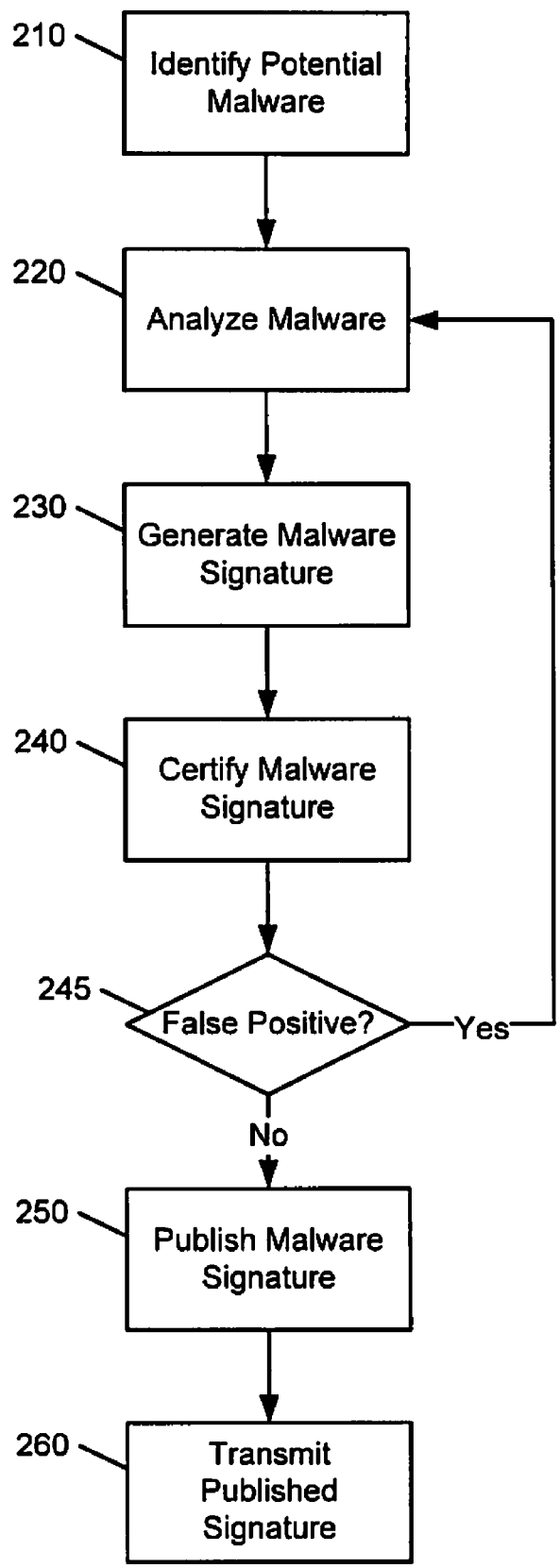
FIG. 2 is a simplified flow diagram of a process leading to the transmission of published signature definitions.

FIG. 2 is a simplified flow diagram of a process leading to the transmission of published signature definitions. Once potential malware has been identified (210), the malware is submitted for analysis (220) (e.g., by analysis engines 140). As discussed above, the analysis process can involve a variety of analysis mechanisms designed to ultimately generate a malware signature (230). The generated malware signature is then submitted for certification against false positives (240).

As discussed above, false positive analysis is performed by comparing the signature of the malware to signatures generated by the same method for files found in a clean file collection. Such a certification comparison is performed to avoid having client anti-malware software removing files that actually should be on a client computer, such as operating system files and application files. If a false positive is detected (245), then the malware is submitted for further analysis in order to generate an alternative signature.

Once a malware signature has passed the certification process, that signature is ready to be provided to a signature update server 110 and ultimately to be published by the signature update server (250). Embodiments of the present invention perform publication of a malware signature through both a full signature definition update and a streaming signature definition update. The publication process will be described more fully below. Upon publication of malware signatures, the malware signatures are transmitted to clients of the anti-malware software provider (260).

Figure 3:
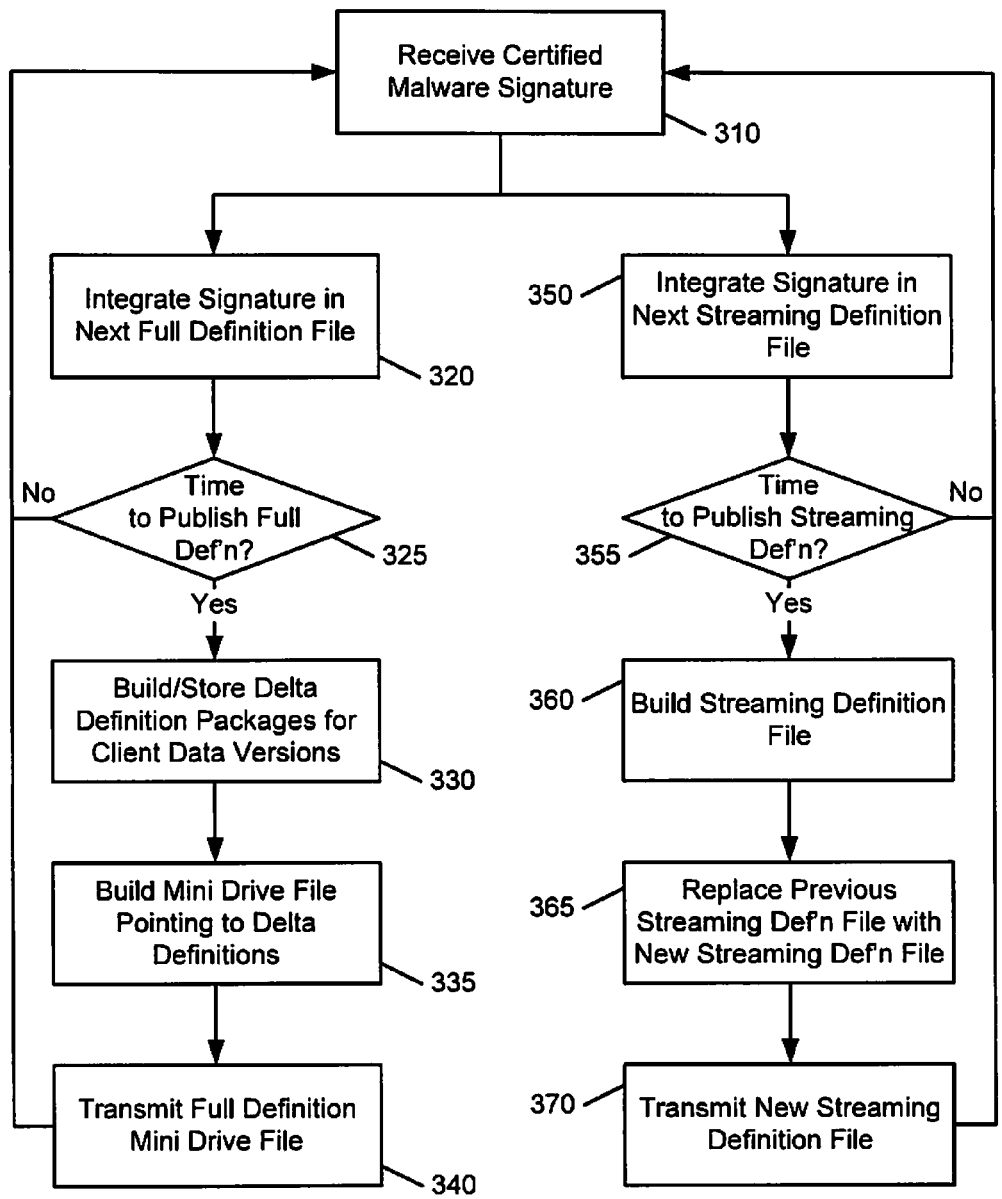
FIG. 3 is a simplified flow diagram of a malware signature publication process performed by signature update server 110 in accord with embodiments of the present invention.

FIG. 3 is a simplified flow diagram of a malware signature publication process performed by signature update server 110 in accord with embodiments of the present invention. Upon receipt of a certified malware signature (310), the signature update server, follows a parallel publication path for the certified malware signature. In one publication path (320-340) the certified malware signature is incorporated into the next version of a full signature definition file. As discussed above, assembly and publication time frames for a full signature definition file are on the order of hours. The second publication path (350-370) integrates the certified malware signature into the next streaming signature definition file. As also discussed above, streaming signature definition files are published in time periods on the order of minutes.

In the full signature definition publication path, the received certified malware signature is integrated into the next full signature definition file (320). Such an integration process includes not only adding the newly arrived certified malware signature to the full definition file but also verifying the integrity of the full signature definition file after the signature has been added. A full signature definition file incorporates signatures in an optimized tree that comprises various data structures associated with the incorporated signatures. In one embodiment of the present invention, a goal of the optimized tree is a small data file with high performance. Inclusion of the newly-arrived certified malware signature into the full signature definition file involves incorporating the new signature into the optimized tree.

A determination is made by the signature update server as to whether a publication threshold time has been met for the full signature definition file (325). If the publication threshold time has not been met, then the signature update server waits to receive the next certified malware signature for integration into the full signature definition file. If the publication threshold time has been met for the full signature definition file, then the signature update server initiates a process for publication of the full signature definition file. Alternatively, a threshold can be set as to a number of new certified malware signatures to include into a next version of the full signature definition file and once that number of signatures has arrived, a new full signature definition file can be published.

In order to publish the full signature definition file, the signature update server builds and stores delta definition packages for distribution to possible client data versions (330). In order to conserve network bandwidth resources, a complete full signature definition file need not be transmitted to each client computer each time a full signature definition file is published. Instead, a client need only to download that portion of the full signature definition tree that has been changed or added since that client's last download of a full signature definition file. Since a client computer may not have been active at the most recent publication of a full signature definition file, the client computer can request those definitions that have been changed or added since the version of the full signature definition file that was last downloaded and stored on the client computer. In order to facilitate this process, signature update server 110 prepares delta definition files that include only those changes to the full signature definition file for a variety of expected full signature definition file versions maintained by client computers. In one embodiment of the present invention, a further goal of the above-discussed optimized tree is to construct the tree in a manner that minimizes the size of the delta definition files.

Embodiments of the present invention can then generate a file containing pointers to each delta definition file and associate those pointers with corresponding versions of the full signature definition file installed on a client computer (335). This file, called a mini drive file, is provided to the client computers and enables the client computers to access the appropriate delta definition set of the full signature definition file in order to update the full signature definition file on the client computer.

Once the full signature definition mini drive file is built, signature update server 110 can transmit the full signature definition mini drive file to client computers 120(1)-(M). Embodiments of the present invention can provide transmission of the full signature definition mini drive files in a variety of manners. For example, in a "pull transmission model," a client computer can track the time of last update to the full signature definition file maintained by the client computer and if a threshold period of time has elapsed since that update, the client computer can then request the most recent version of the full signature definition mini drive file from signature update server 110 or a designated distribution server. Alternatively, in a "push transmission mode," signature update server 110 (or a designated distribution server) can transmit the full signature definition mini drive file at any time after the publication threshold period has been met. In such a push model, any client computer listening for the transmission will receive the full signature definition mini drive file and begin the process of updating the full signature definition file resident on the client.

Publication of the certified malware signature in a streaming signature definition file in the parallel publication process has certain differences from publication in the full signature definition file. Upon receipt of the certified malware signature, the signature is integrated into the next streaming signature definition file (350). Streaming signature definition files do not require the optimized tree structure of the full signature definition file. Instead, the signature itself or a pointer to the signature is included in the streaming signature definition file. This can be done, in part, because only those signatures that arrive during the period in which the streaming signature definition file is being built will be in the next published signature definition file. Thus, the amount of data in the streaming signature definition file will be significantly less than the amount of data in a full signature definition file. A determination is made as to whether a streaming threshold time has elapsed in which to publish the next streaming signature definition file (355). If not, then the signature update server waits to receive the next certified malware signature (310). As discussed above, the threshold period in which to publish a streaming signature definition file is significantly less than that in which to publish a full signature definition file and, in an embodiment of the present invention, is intended to be on the order of minutes (e.g., 5 minutes).

If the streaming signature definition publication threshold time has elapsed, then signature update server 110 can build the streaming signature definition file (360). Unlike the full signature definition mini drive file, the streaming signature definition file is intended to include the signatures themselves that are being published in this streaming signature definition. Should a signature be too long for publication directly in the streaming signature definition file, a pointer can be provided to that signature. Embodiments of the present invention can then replace the previous version of the streaming signature definition file with the version of the streaming signature definition file that has just been built (365). Thus, a streaming signature definition file that is being published to clients only contains those certified malware signatures (or pointers thereto) that have been received by the signature update server during the period in which the current streaming signature definition file was built (e.g., the 5 minute period prior to publication of the current streaming signature definition file). Embodiments of the present invention can then transmit the current version of the streaming signature definition file to client computers (370). As discussed above, such transmission can be performed using either a push transmission model or a pull transmission model and be performed either directly by the signature update server to the clients or indirectly via distribution servers.

The parallel publication method for distribution of certified malware signatures described above allows for rapid publication of newly arrived certified malware signatures to clients of the anti-malware software provider. The parallel publication method also recognizes that not every client computer will be available to download every streaming signature definition file as it becomes available. For those signature definitions that a client misses by being unavailable at the time of publication of a streaming signature definition file, the client can catch up the next time that the client downloads a full signature definition file. Thus, the client computer can be protected in a rapid fashion against malware having a newly certified signature but in no case will remain unprotected any longer than the next update to the full signature definition file by that client.

Figure 4:
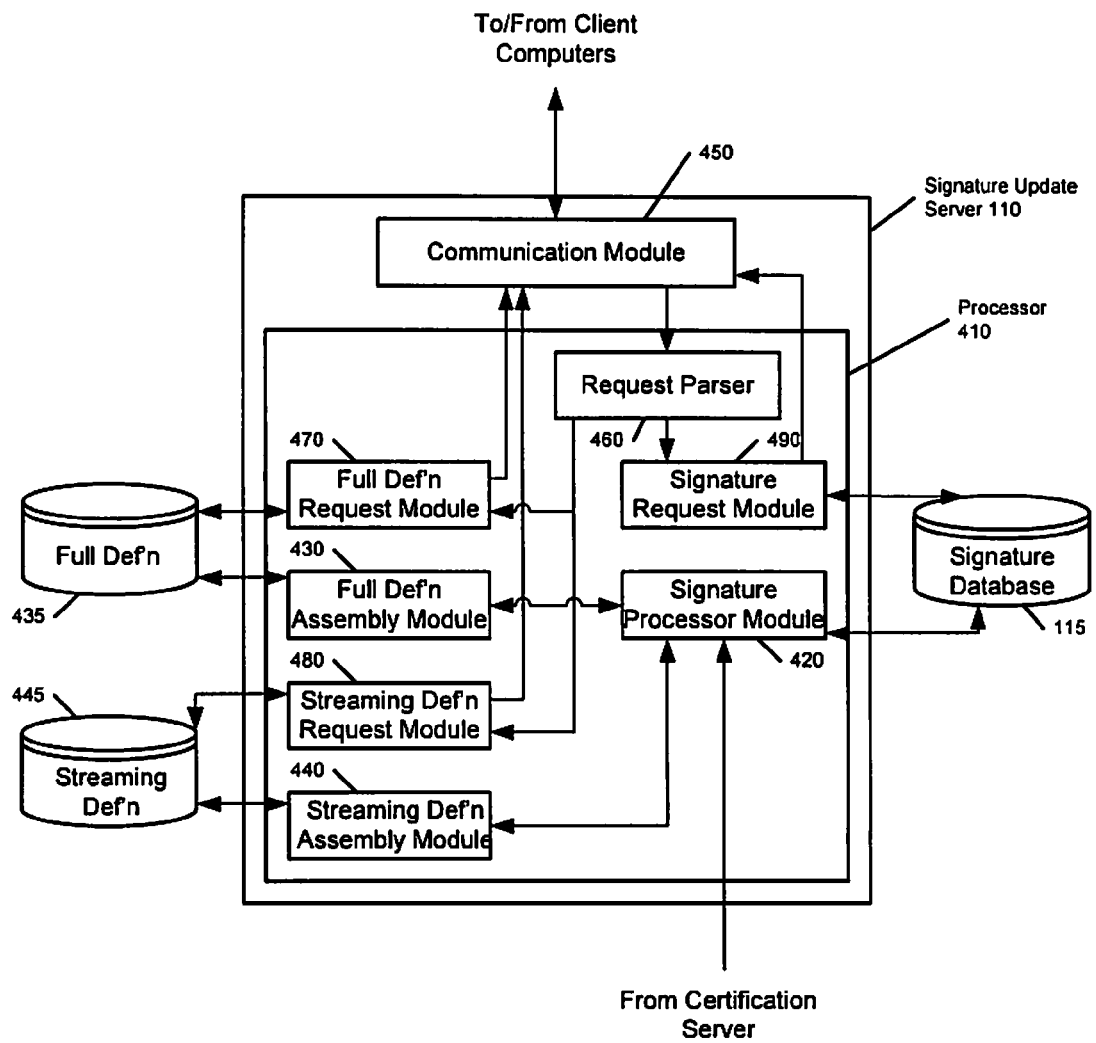
FIG. 4 is a simplified block diagram illustrating a signature update server 110 incorporating embodiments of the present invention.

FIG. 4 is a simplified block diagram illustrating a signature update server 110 incorporating embodiments of the present invention. As discussed above, signature update server 110 receives certified malware signatures from certification servers 150(1)-(P). Embodiments of signature update server 110 provide a processor 410 for processing the certified malware signatures, preparing the full signature definitions and streaming signature definitions, and providing those definition files to clients of the anti-malware software provider. FIG. 4 illustrates the certified malware signatures being received by a signature processing module 420 within processor 410. Signature processing module 420 is configured to store the certified malware signature in signature database 115. Alternatively, a certification server can directly store the certified malware signature in signature database 115 and then an indication can be provided to signature processor module 420 that a new certified malware signature has been stored within signature database 115.

Signature processing module 420 is further configured to provide the received certified malware signature to a full signature definition assembly module 430 and a streaming signature definition assembly module 440. Full signature definition assembly module 430 is configured to integrate the newly arrived malware signature in the full signature definition tree 435, and to further provide for publication of the full signature definition file at the appropriate publication time. Thus, full signature definition assembly module can be further configured to build the previously discussed delta definition packages and the full signature definition mini drive file when the threshold time for publication of the full signature definition file has been reached. Similarly, streaming signature definition assembly module 440 is configured to integrate the newly arrived signature in the list of signatures being incorporated into the next streaming signature definition file (445). Streaming signature definition assembly module 440 can also be configured to build the streaming signature definition file at publication time and to replace the previously published streaming signature definition file, as discussed above. Thus, streaming signature definition assembly module 440 can perform tasks related to publication of a streaming signature definition file when the threshold time for publication of the streaming signature definition file has been reached.

As illustrated, signature update server 110 includes a communication module 450 for receiving and transmitting information from and to client computers. Communication module 450 can perform these tasks using a variety of protocols including, for example, an application programming interface to communicate with anti-malware software installed on the client computers. Communication module 450 is configured to provide requests received from clients to request parser 460 in processor 410. Request parser 460 is configured to determine the nature of a request received from a client and to provide that request to an appropriate request processing module. For example, in a pull transmission mode of operation, if a client requests a download of a full signature definition file, request parser 460 provides that request to full signature definition request module 470. Similarly, if request parser 460 receives a request for a streaming signature definition file, then request parser 460 provides that request to streaming signature definition request module 480.

In response to a request for a full signature definition file, full signature definition request module 470 can retrieve the most recent full signature definition mini drive file from full signature definition storage area 435 and provide that full signature definition mini drive file to communication module 450 for transmission to the requesting client. In response to receiving the full signature definition mini drive file, the requesting client can then request an appropriate delta definition file from signature update server 110. Request parser 460 can then forward the request for the delta definition file to full signature definition request module 470 which can then retrieve the delta definition file from the full signature definition storage area 435 and provide that to communication module 450 for transmission to the requesting client. Alternatively, the full signature definition mini drive file can include a pointer to a storage area in a separate distribution server that is configured specifically to provide delta definition files to requesting clients.

If request parser 460 receives a request for a streaming signature definition file, then request parser 460 provides that request to streaming signature definition request module 480. Streaming signature definition request module 480 can then retrieve the most recent streaming signature definition file from streaming signature definition storage area 445 and provide that streaming signature definition file to the requesting client through communication module 450. As discussed above, the streaming signature definition file can contain either full versions of the certified malware signatures received from the certification servers during the current publication period or a pointer to a location of that signature from which the requesting client can download the signature.

In response to receiving a pointer to a malware signature in a streaming signature definition mini drive file, a client can submit a request to signature update server 110 for the signature. Upon receiving the signature request, request parser 460 can provide that signature request to a signature request module 490 that can retrieve the requested signature from signature database 115 and provide the requested signature to the requesting client via communication module 450. Alternatively, as above, the pointer to the signature that is not included within the streaming signature definition mini drive file can be directed toward a separate distribution server configured to provide signatures to requesting clients.

It should be noted that while FIG. 4 illustrates different modules that have been described as performing particular tasks, embodiments of the invention are not limited to such a configuration. For example, tasks described as being performed by two or more separate modules can be performed by a single module. Further, storage that has been described as being provided by a database can be alternatively provided by other acceptable data structures.

Figure 5:
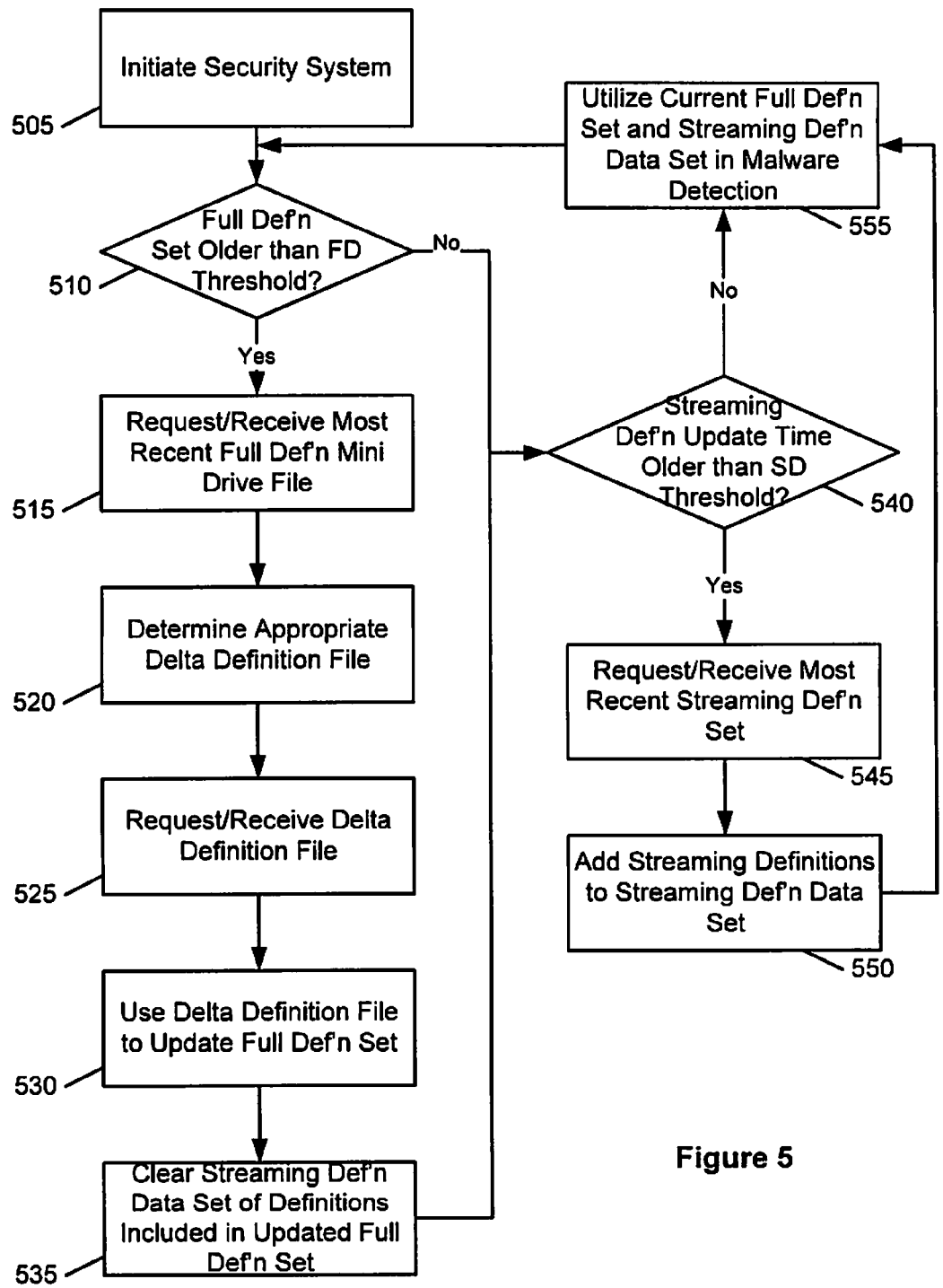
FIG. 5 is a simplified flow diagram illustrating a signature definition update process performed by a client computer in accord with embodiments of the present invention.

FIG. 5 is a simplified flow diagram illustrating a signature definition update process performed by a client computer in accord with embodiments of the present invention. As an initial step, the client computer initiates the anti-malware software (505). The initiation process can include determining the time of last update of the full signature definition file and any streaming signature definition files installed on the client. A determination is made by the client as to whether the last update time for the full streaming definition set is above a threshold for updating the full streaming definition file (510). As discussed above, a full streaming definition threshold time is typically on the order of hours (e.g., 8 hours). If the last update of the full streaming definition set exceeds the predetermined threshold time, then the client can request and receive the most recent full signature definition mini drive file (515). The client can then compare a version number associated with the current update of the full streaming definition set with the versions identified in the full streaming definition mini drive file so as to identify information associated with an appropriate delta definition file (520). Once the information for the appropriate delta definition file has been identified, then the client can request and receive the appropriate delta definition file (525). As discussed above, the client can request a delta definition file from either the signature update server or an identified distribution server.

Upon receiving the requested delta definition file, the client can use the information in the delta definition file to update the full signature definition set installed on the client (530). As discussed above, the delta definition file contains information related to those parts of the full signature definition tree that have been changed since the previously-installed version of the full signature definition set on the client computer. The anti-malware software installed on the client computer can be configured to incorporate the changes expressed by the delta definition file into the active version of the full signature definition set installed on the client computer.

Once the updated full signature definition set is active on the client computer, then the client computer can clear the streaming signature definition data set of any definitions included in the updated full signature definition set (535). Embodiments of the present invention can provide this functionality by including a full signature definition set version identification with each streaming signature definition. Thus, when the full signature definition set installed on a client computer matches the associated full streaming definition set version identifier associated with a streaming signature definition, the streaming signature definition can be removed from the streaming signature definition data set maintained by the client computer.

A client computer can then be configured to determine whether the last streaming signature definition update time exceeds a set threshold for streaming signature definitions (540). Note that this step can also be performed subsequent to a determination that the full signature definition update time does not exceed the full signature definition update threshold. If the streaming signature definition update time does not exceed the streaming signature definition threshold, then the anti-malware software can perform functionality using the currently installed full signature definition set and streaming signature definition set until the streaming signature definition threshold time has been met.

Once the streaming signature definition threshold time has been met, the client can request and receive the most recent streaming signature definition mini drive file from signature update server 110 (545). Upon receipt of the streaming signature definition mini drive file, the client can add the streaming signature definitions present in the mini drive file to a streaming signature data set maintained by the client computer (550). This step can also include requesting and receiving any signatures that are not included in the streaming signature definition mini drive file but which have pointers to the signature. Once incorporated in the streaming signature definition data set, the client computer can utilize signature information in both the full signature definition data set and the streaming signature definition data set in performing malware detection and remediation (555).

FIG. 5 is illustrative of a client computer functioning in a pull transmission mode in which the client computer initiates transmission of both the full signature definition and streaming signature definition information. Alternatively, a client can function in a push transmission mode in which the client adopts a listening posture, awaiting receipt of transmission of full signature definition and streaming signature definition files. A further alternative can involve a client that functions in a pull transmission mode for full signature definition information and a push transmission mode for streaming signature definitions.

It should be appreciated that a client computer operating using the process illustrated in FIG. 5 may miss an opportunity to download one or more streaming signature definition mini drive files if that client computer is disconnected from a network or is otherwise inactive for any period of time. Since streaming signature definition files are additive to the information found in a full signature definition file and since each subsequent streaming signature definition file only contains newly arrived certified malware signatures, there may be gaps in signatures found in the streaming signature definition data set of the client computer. It should further be appreciated, however, that the client computer will be brought up to date by the next update of the full signature definition data set and all gaps will be filled at that point. Thus, a client computer implementing embodiments of the present invention can be no worse off than a client computer that does not implement embodiments of the present invention (e.g., a client that only receives full signature definitions) but a client computer implementing embodiments of the present invention can be potentially protected against new instances of malware far sooner than a client computer not implementing embodiments of the present invention. It should also be appreciated that the update threshold periods on the client computer for both full signature definitions and streaming signature definitions should be set to the same time period as the publication time periods configured on the signature update server.

Embodiments of the present invention not only provide for more frequent updates of signature data sets on a client (e.g., on the order of minutes), but also provides such functionality with a minimal impact on network bandwidth utilization then would more frequent publication of full signature definition data sets. Such reduced bandwidth consumption is realized because the streaming signature definition files contain only those signatures that are new during the publication period. Since such signatures average 50 bytes and it is expected that there would be between 50 to 150 new signatures every five minutes, a streaming signature definition mini drive file would be expected to be between 2500 to 7500 bytes. Network bandwidth impact could then be distributed among distribution servers and would be dependent upon the number of client computers requesting the streaming signature definitions or the mechanism by which a push transmission distribution server provides to those streaming signature definitions (e.g., broadcast or multicast).

An Example Computing And Network Environment

As shown above, the present invention can be implemented using a variety of computer systems and networks. An example of one such computing and network environment is described below with reference to FIGS. 6 and 7.

Figure 6:
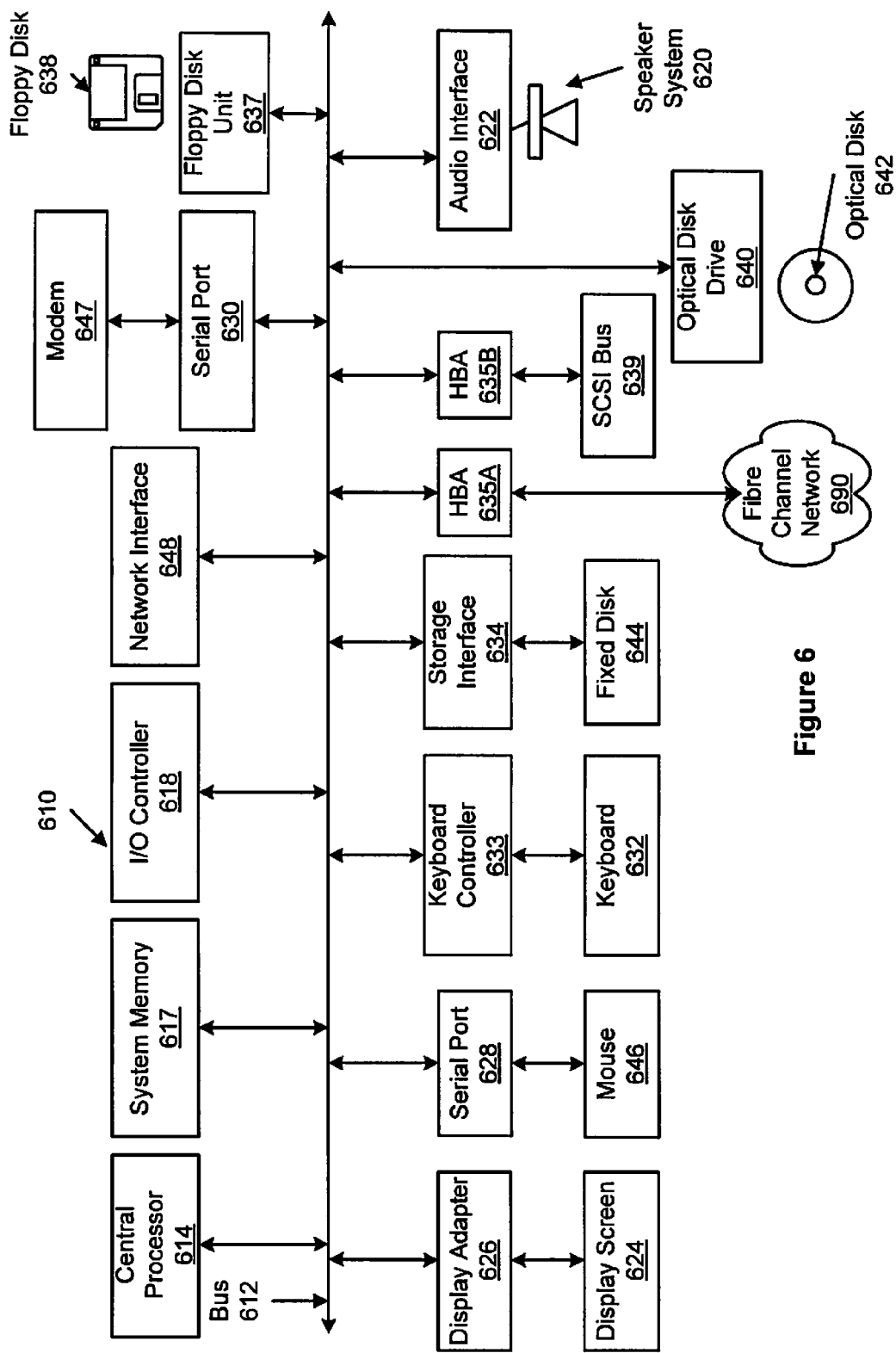
FIG. 6 depicts a block diagram of a computer system suitable for implementing embodiments of the present invention.

FIG. 6 depicts a block diagram of a computer system 610 suitable for implementing embodiments of the present invention (e.g., signature update server 110 and client computers 120(1)-(M)). Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present invention. The devices and subsystems can be interconnected in different ways from that shown in FIG. 6. The operation of a computer system such as that shown in FIG. 6 is readily known in the art and is not discussed in detail in this application. Code to implement the present invention can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
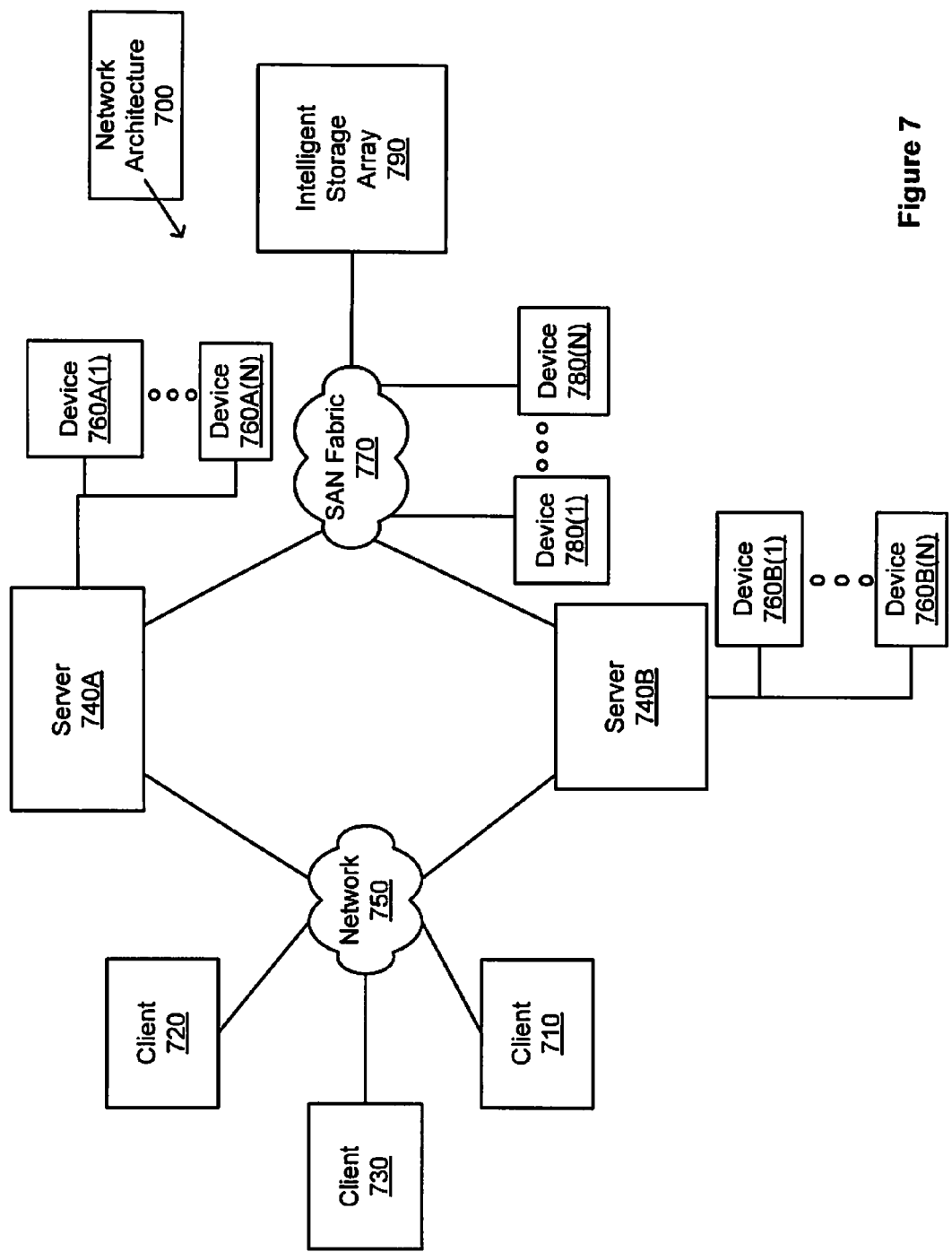
FIG. 7 is a block diagram depicting a network architecture suitable for implementing embodiments of the present invention.

FIG. 7 is a block diagram depicting a network architecture 700 in which client systems 710, 720 and 730, as well as storage servers 740A and 740B (any of which can be implemented using computer system 610), are coupled to a network 750. Storage server 740A is further depicted as having storage devices 760A(1)-(N) directly attached, and storage server 740B is depicted with storage devices 760B(1)-(N) directly attached. Storage servers 740A and 740B are also connected to a SAN fabric 770, although connection to a storage area network is not required for operation of the invention. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 610). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal-bearing media used to actually carry out the distribution. Examples of signal-bearing media include computer-readable storage media, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    assembling a full signature definition file comprising a first received malware signature, upon receipt of the first received malware signature, wherein
        the full signature definition file further comprises a first plurality of malware signatures received up to a specified time;
    associating a version identifier with the full signature definition file;
    publishing the full signature definition file after the specified time;
    assembling a streaming signature definition file comprising the first received malware signature, upon the receipt of the first received malware signature, wherein
        the streaming signature definition file further comprises a second plurality of malware signatures received over a first time period,
        the first time period occurs prior to the specified time, and
        the first received malware signature is received during the first time period;
    associating the version identifier with the streaming signature definition file; and
    publishing the streaming signature definition file upon completion of the first time period.

2. The method of claim 1 wherein said publishing the streaming signature definition file comprises:
    transmitting the streaming signature definition file in response to a request from a first remote node; and
    the request from the first remote node is received during a second time period, wherein the second time period occurs after the first time period.

3. The method of claim 2 further comprising:
    using a previous full signature definition file and the streaming signature definition file for scanning the first remote node for instances of malware corresponding to one of the first received signature and the first plurality of malware signatures, wherein
        said scanning the first remote node is performed prior to the specified time.

4. The method of claim 1 further comprising:
    assembling a second streaming signature definition file comprising a third plurality of signatures received over a second time period, wherein the second time period occurs after the first time period, and the second time period occurs prior to the specified time;

associating the version identifier with the second streaming signature definition file; and publishing the second streaming signature definition file upon completion of the second time period.

5. The method of claim 4 wherein said publishing the second streaming signature definition file comprises:

replacing the streaming signature definition file with the second streaming signature definition file upon completion of the second time period.

6. The method of claim 1 wherein the first received malware signature, the first plurality of malware signatures and the second plurality of malware signatures are received from one or more malware signature certification engines.

7. The method of claim 1 wherein said assembling the streaming signature definition file comprises:

appending the first received malware signature to a list comprising one or more malware signatures of the second plurality of malware signatures.

8. The method of claim 1 wherein said assembling the streaming signature definition file comprises:

appending a pointer corresponding to the first received malware signature to a list comprising one or more pointers to corresponding malware signatures of the second plurality of malware signatures, wherein the pointer corresponding to the first received malware signature comprises information regarding a location of the first received malware signature.

9. The method of claim 4, further comprising:

producing a published full signature definition file by publishing the full signature definition file at a second specified time;

downloading the published full signature definition file to a remote node after the second specified time;

comparing a version identifier of the published full signature definition file to one or more version identifiers of one or more local streaming signature definition files, wherein the one or more local streaming signature definition files were downloaded to the remote node before the published full signature definition file was downloaded; and removing ones of the local streaming signature definition files that comprise version identifiers that match the version identifier of the published full signature definition file.

10. The method of claim 1, wherein the assembling the full signature definition file comprises incorporating the first received malware signature into the full signature definition file, wherein the first received malware signature is incorporated into an optimized tree structure comprising the first plurality of malware signatures; and verifying the integrity of the full signature definition file after the incorporating the first received malware signature.

11. An apparatus comprising:

a processor;

a network interface, coupled to the processor, and configured to receive a first malware signature, a first plurality of malware signatures, and a second plurality of malware signatures;

a first storage volume, coupled to the processor, and configured to store a full signature definition file, wherein the full signature definition file comprises the first malware signature;

a second storage volume, coupled to the processor, and configured to store a streaming signature definition file, wherein the streaming signature definition file comprises the first malware signature; and a memory, coupled to the processor, and storing instructions executable by the processor, the instructions configured to assemble the full signature definition file, upon receipt of the first received malware signature, wherein the full signature definition file further comprises a first plurality of malware signatures received up to a specified time, associate a version identifier with the full signature definition file, publish the full signature definition file after the specified time, assemble the streaming signature definition file, upon the receipt of the first received malware signature, wherein the streaming signature definition file further comprises a second plurality of malware signatures received over a first time period that occurs prior to the specified time, and the first received malware signature is received during the first time period, associate the version identifier with the streaming signature definition file, and publish the streaming signature definition file upon completion of the first time period.

12. The apparatus of claim 11 further comprising:

a second network interface, coupled to the processor, and configured to transmit the streaming signature definition file; and the memory storing further instructions for publishing the streaming signature definition file, executable by the processor, and configured to transmit the streaming signature definition file, using the second network interface, in response to a request from a first remote node, wherein the request from the first remote node is received during a second time period, and the second time period occurs after the first end time.

13. The apparatus of claim 11 further comprising:

the memory storing further instructions, executable by the processor, and configured to assemble a second streaming signature definition file comprising a third plurality of signatures received over a second time period, wherein the second time period occurs after the first time period and prior to the specified time, associate the version identifier with the second streaming signature definition file, and publish the second streaming signature definition file upon completion of the second time period.

14. The apparatus of claim 13 further comprising:

the memory storing further instructions for publishing the second streaming signature file, executable by the processor, and configured to replace the streaming signature definition file with the second streaming signature definition file upon completion of the second time period.

15. The apparatus of claim 11 further comprising:

the memory storing further instructions for assembling the streaming signature definition file, executable by the processor, and configured to append the first malware signature to a list comprising one or more malware signatures of the second plurality of malware signatures.

16. The apparatus of claim 11 further comprising:
the memory storing further instructions for assembling the streaming signature definition file, executable by the processor, and configured to append a pointer corresponding to the first malware signature to a list comprising one or more pointers to corresponding malware signatures of the second plurality of malware signatures, wherein the pointer corresponding to the first malware signature comprises information regarding a location of the first malware signature.

17. A system comprising:
a signature update server comprising a processor and a memory coupled to the processor, the memory storing instructions executable by the processor, the instructions configured to implement:
  a signal processor module configured to
    receive a first malware signature, and
    provide the first malware signature to a full definition assembly module and a streaming definition assembly module;
  the full definition assembly module, coupled to the signal processor module, and configured to
    assemble a full signature definition file comprising the first malware signature upon receipt of the first received malware signature,
    associate a version identifier with the full signature definition file, and
    to store the full signature definition file in an associated first memory, wherein
      the full signature definition file further comprises a first plurality of malware signatures received by the full definition assembly module up to a specified time;
  a full definition request module, coupled to the first memory, and configured to transmit all or part of the full signature definition file after the specified time;
  the streaming definition assembly module, coupled to the signal processor module, and configured to
    assemble a streaming signature definition file comprising the first malware signature upon the receipt of the first received malware signature,
    associate the version identifier with the streaming signature definition file, and
    store the streaming signature definition file in an associated second memory, wherein
      the streaming signature definition file further comprises a second plurality of malware signatures received over a first time period,
      the first time period occurs prior to the specified time; and
      the first received malware signature is received during the first time period; and
  a streaming definition request module, coupled to the second memory, and configured to transmit the streaming signature definition file upon completion of the first time period.

18. The system of claim 17 further comprising:
a remote node, coupled to the streaming definition request module by a network, and configured to request the streaming signature definition file, wherein the request is received during a second time period and the second time period occurs after the first time period; and
the streaming definition request module is further configured to perform said transmitting the streaming signature definition file in response to the request from the remote node.

19. The system of claim 17 further comprising:
the signal processor module is further configured to receive a third plurality of signatures over a second time period, wherein
  the second time period occurs after the first time period, and
  the second time period occurs prior to the specified time;
the streaming definition assembly module is further configured to assemble a second streaming signature definition file comprising the third plurality of signatures and store the second streaming signature definition file in the associated second memory; and
the streaming definition request module is further configured to transmit the second streaming definition file upon completion of the second time period.

20. The system of claim 17 further comprising:
one or more malware signature certification engines, coupled to the signal processor module, and configured to provide the first received malware signature, the first plurality of malware signatures and the second plurality of malware signatures to the signal processor module.

21. The system of claim 17 wherein the streaming signature definition assembly module is further configured to:
assemble the streaming signature definition file by appending the first malware signature to a list comprising one or more malware signatures of the second plurality of malware signatures.

22. The system of claim 17 wherein the streaming signature definition assembly module is further configured to:
assemble the streaming signature definition file by appending a pointer corresponding to the first malware signature to a list comprising one or more pointers to corresponding malware signatures of the second plurality of malware signatures, wherein the pointer corresponding to the first malware signature comprises information regarding a location of the first malware signature.

* * * * *